(12) United States Patent
Sakai

(10) Patent No.: US 8,351,128 B2
(45) Date of Patent: Jan. 8, 2013

(54) ZOOM LENS AND IMAGE PICKUP APPARATUS USING THE SAME

(75) Inventor: Hideki Sakai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 12/830,956

(22) Filed: Jul. 6, 2010

(65) Prior Publication Data

US 2011/0007405 A1   Jan. 13, 2011

(30) Foreign Application Priority Data

Jul. 8, 2009   (JP) ................................ 2009-161758

(51) Int. Cl.
*G02B 15/14*   (2006.01)
(52) U.S. Cl. ........................ 359/682; 359/689
(58) Field of Classification Search .................. 359/680, 359/682, 686, 689
See application file for complete search history.

(56) References Cited

U.S. PATENT DOCUMENTS

| | | | |
|---|---|---|---|
| 5,406,416 A * | 4/1995 | Ohtake | 359/686 |
| 7,215,482 B2 | 5/2007 | Matsusaka | |
| 7,227,696 B1 * | 6/2007 | Nanba | 359/682 |
| 7,295,381 B2 | 11/2007 | Ito | |
| 7,450,318 B2 | 11/2008 | Nanba et al. | |
| 2008/0062532 A1 * | 3/2008 | Iwama | 359/689 |
| 2010/0103531 A1 * | 4/2010 | Shinohara | 359/676 |

* cited by examiner

Primary Examiner — Darryl J Collins

(74) Attorney, Agent, or Firm — Canon U.S.A., Inc. IP Division

(57) ABSTRACT

A zoom lens includes a first lens unit having a negative refractive power, a second lens unit having a positive refractive power, and a third lens unit having a positive refractive power. The first lens unit, the second lens unit, and the third lens unit are arranged in order from an object side to an image side. Distances between the lens units change during zooming. The first lens unit consists of two lenses. Radii of curvature of a lens surface closest to the object side and a lens surface closest to the image side in the first lens unit, a focal length of the first lens unit, and a focal length of the entire zoom lens at a telephoto end are set appropriately.

20 Claims, 13 Drawing Sheets

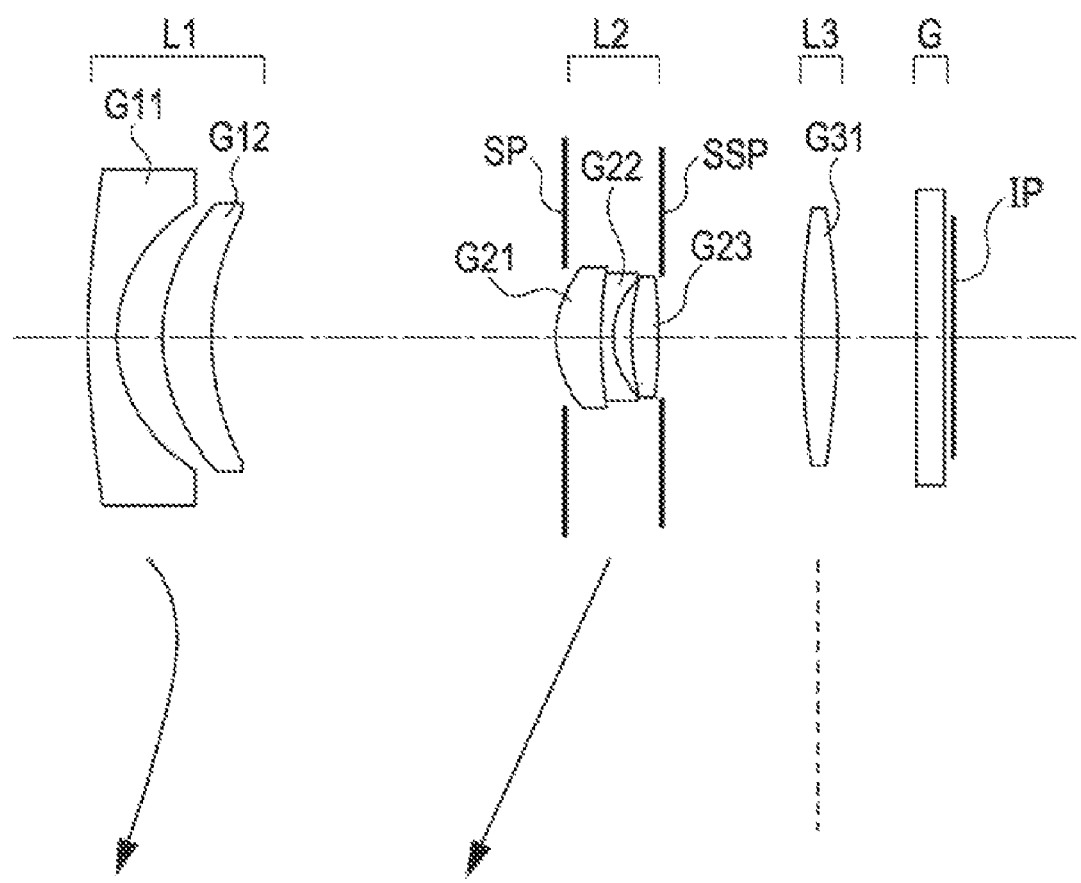

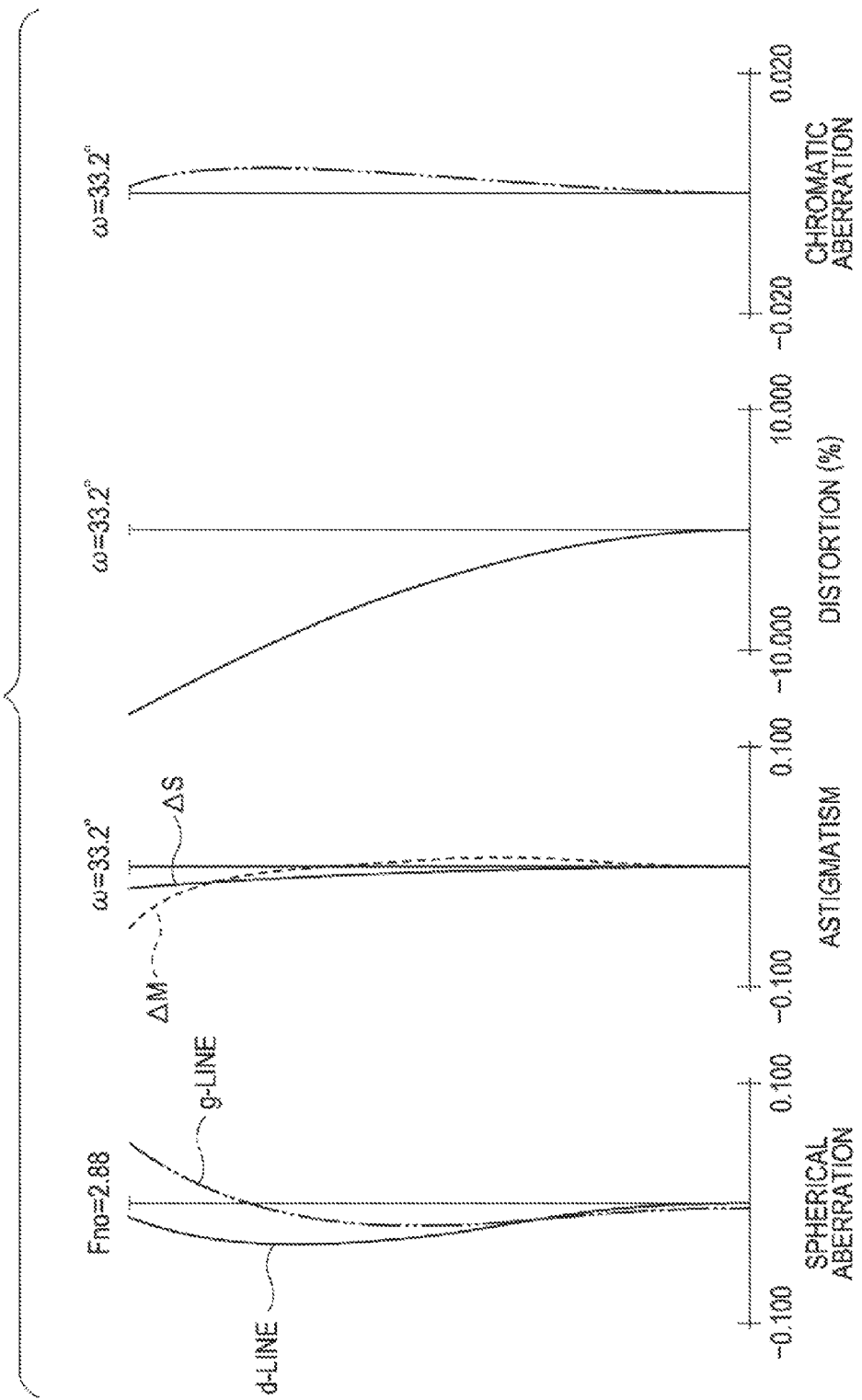

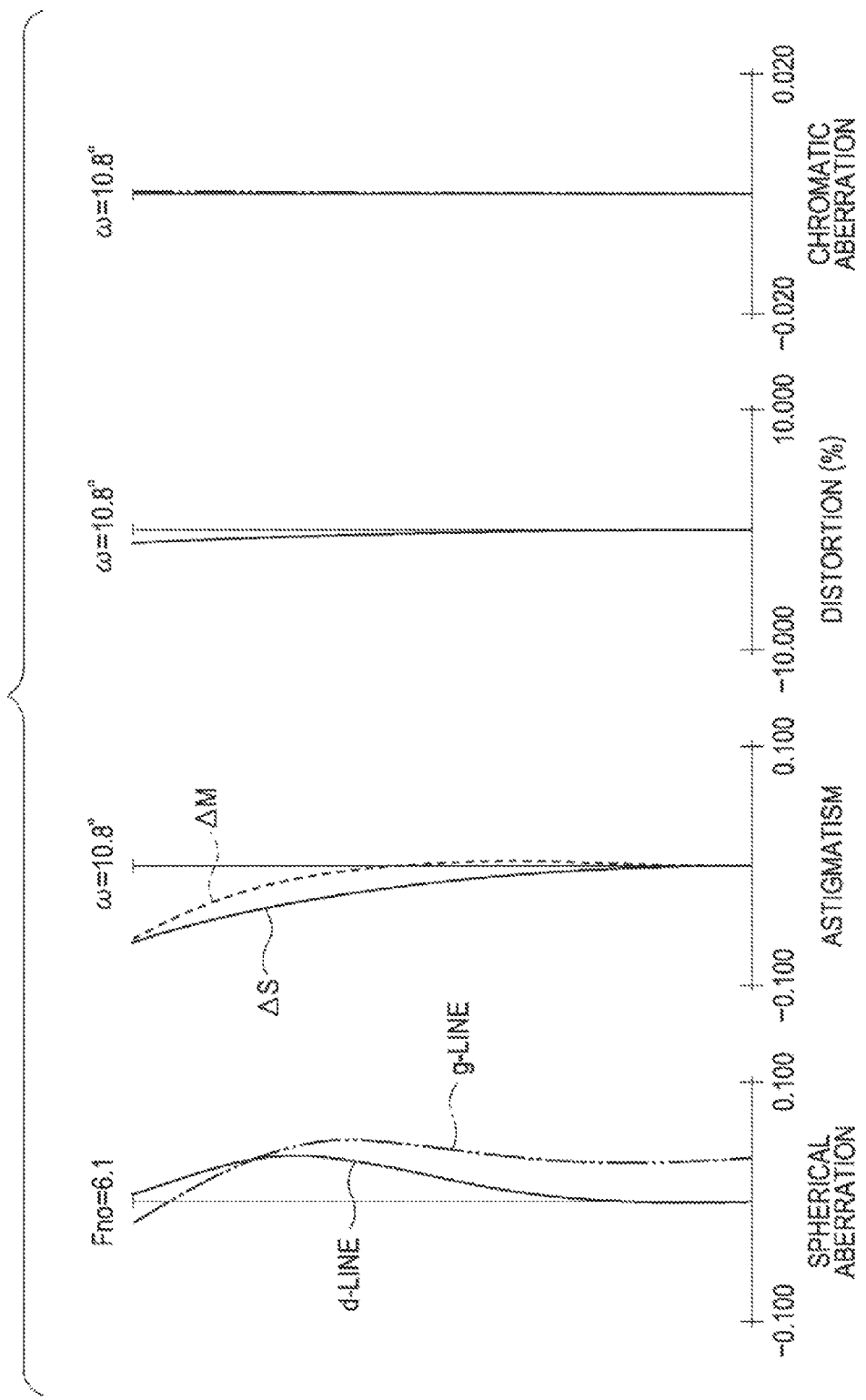

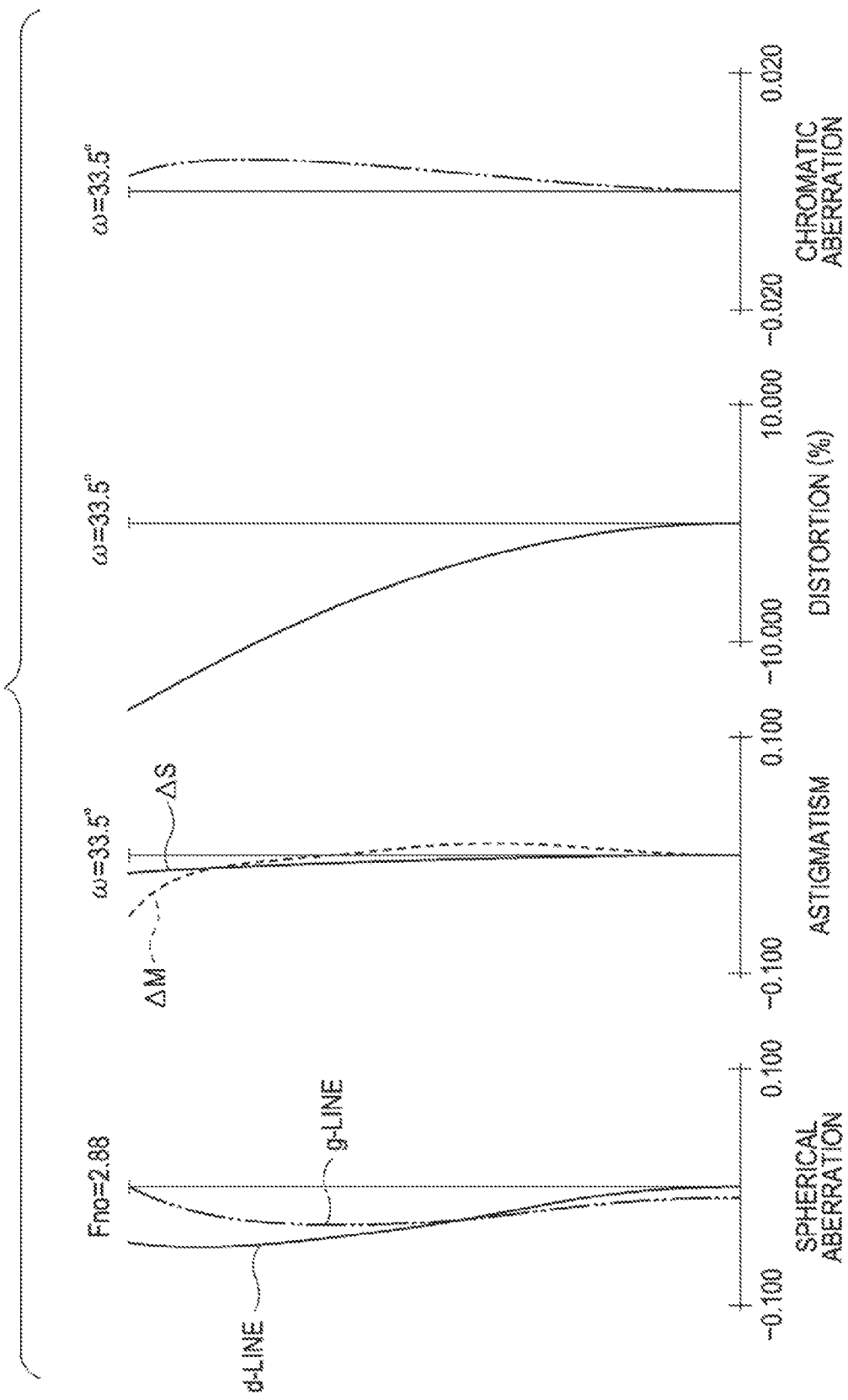

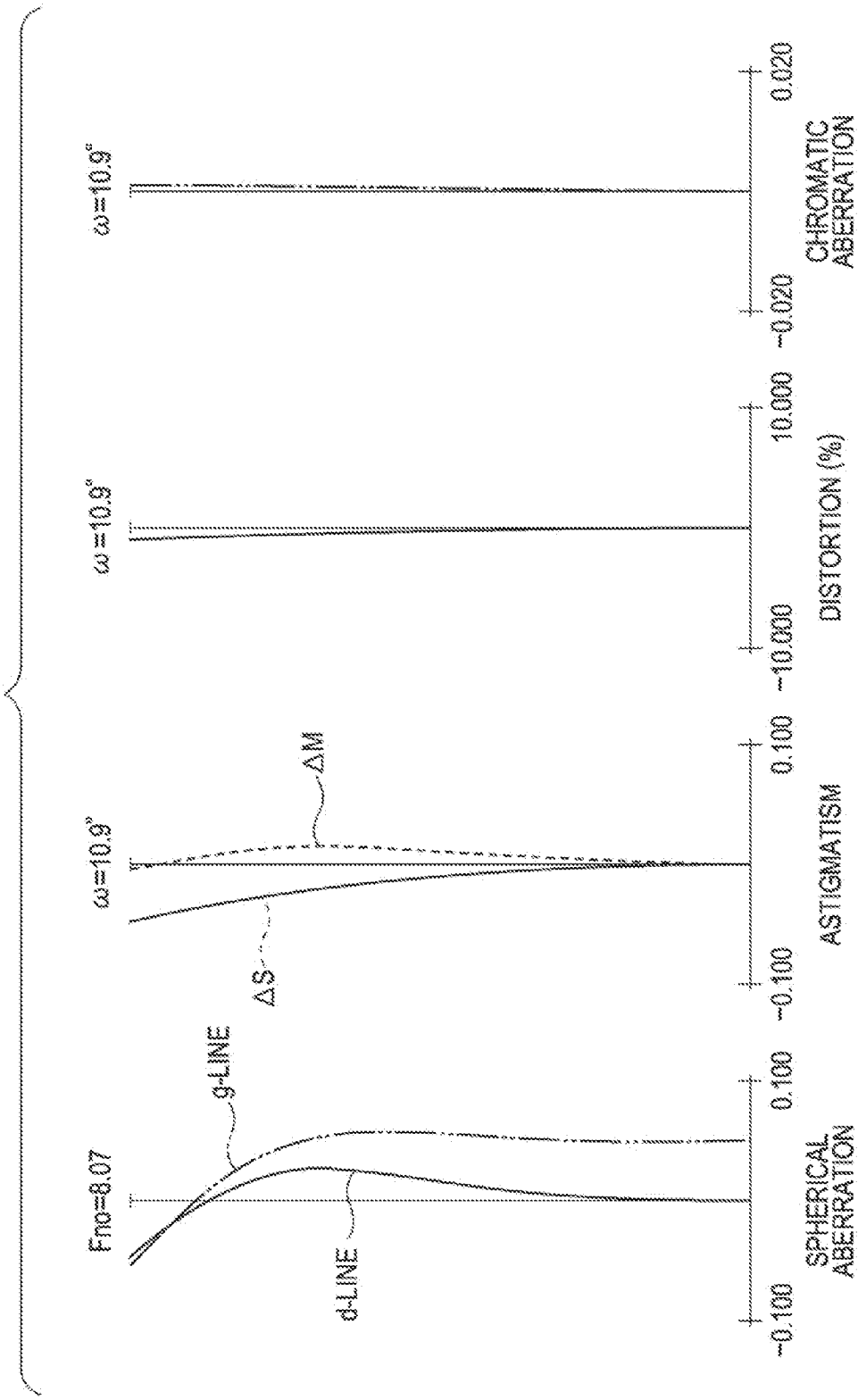

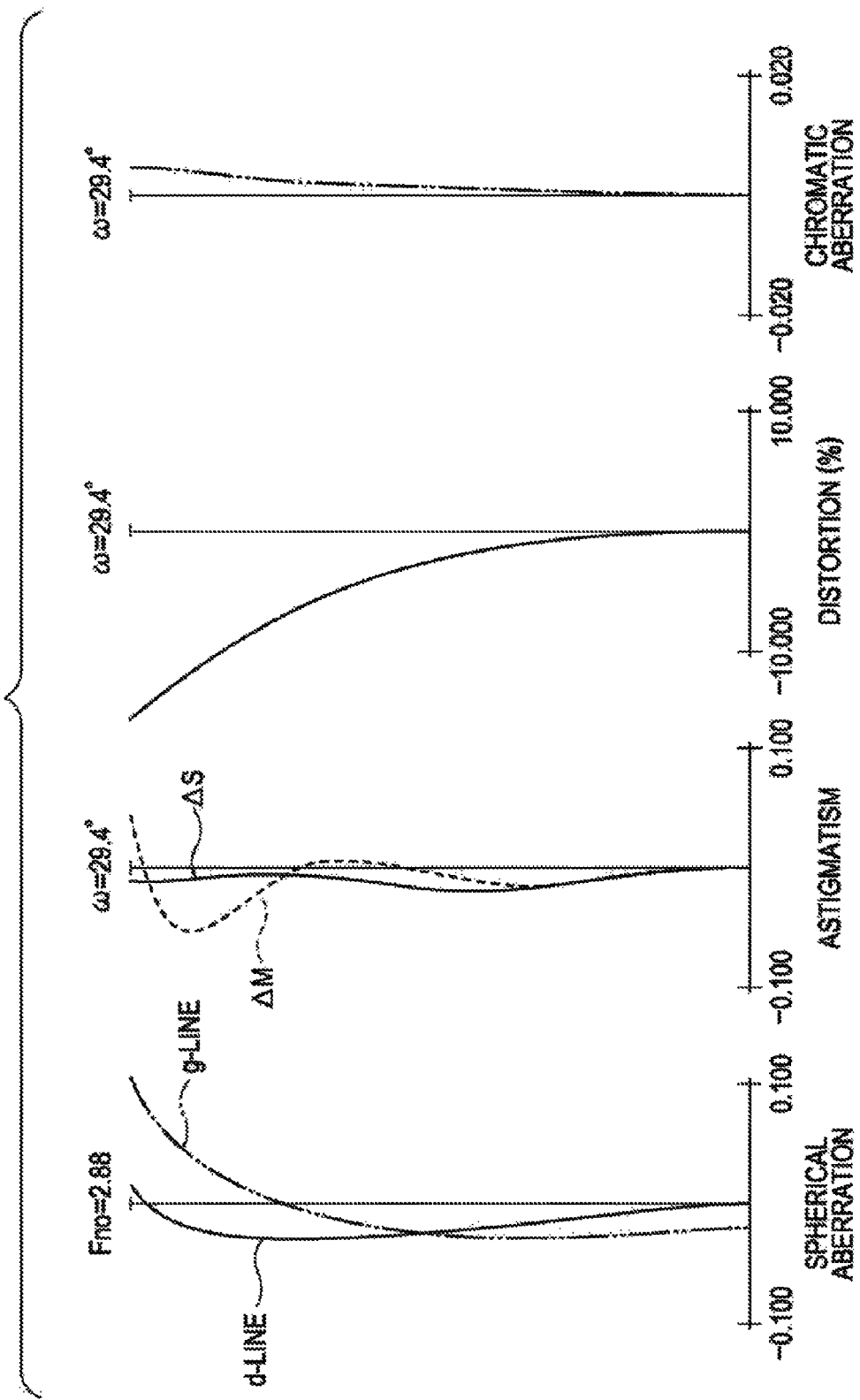

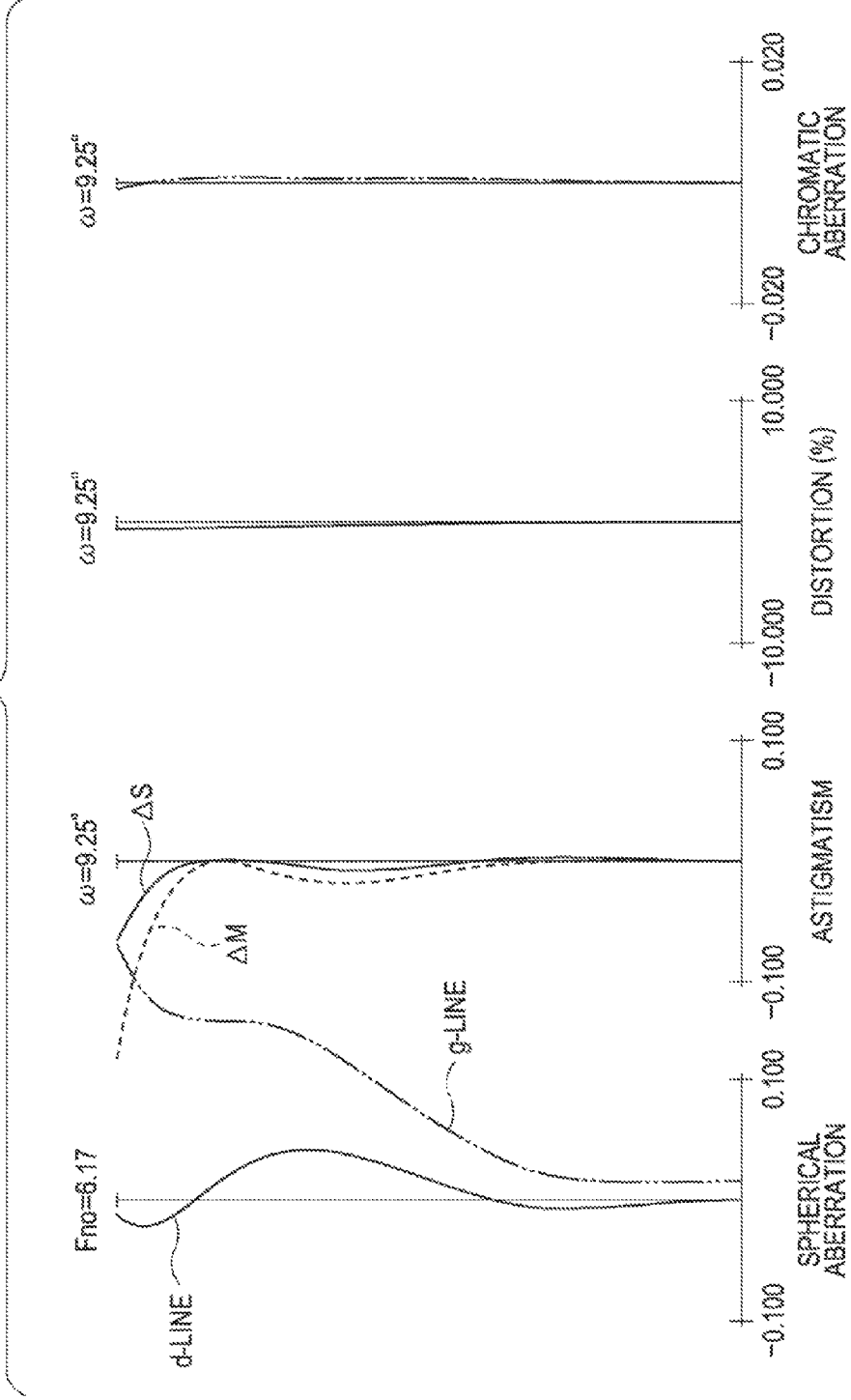

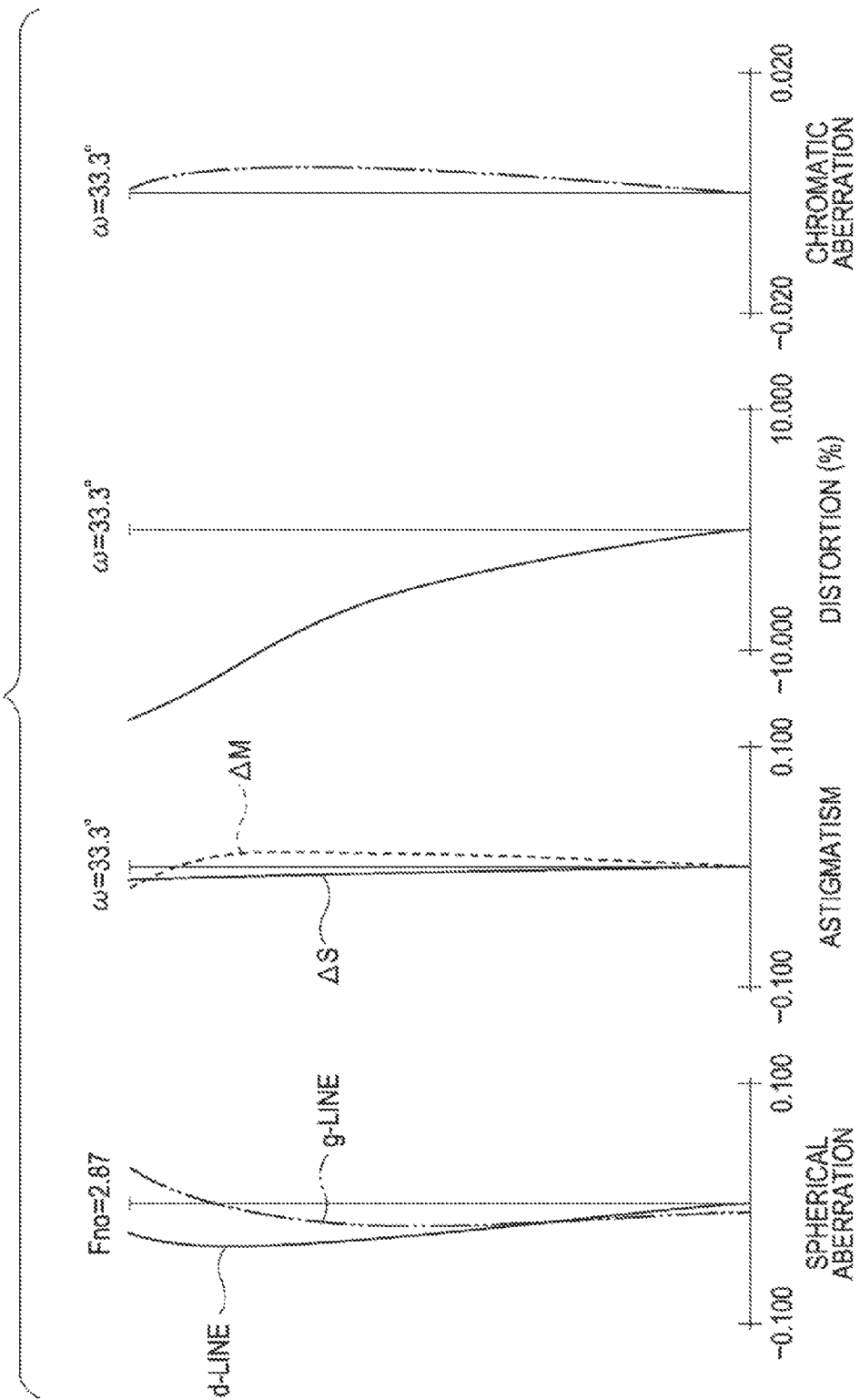

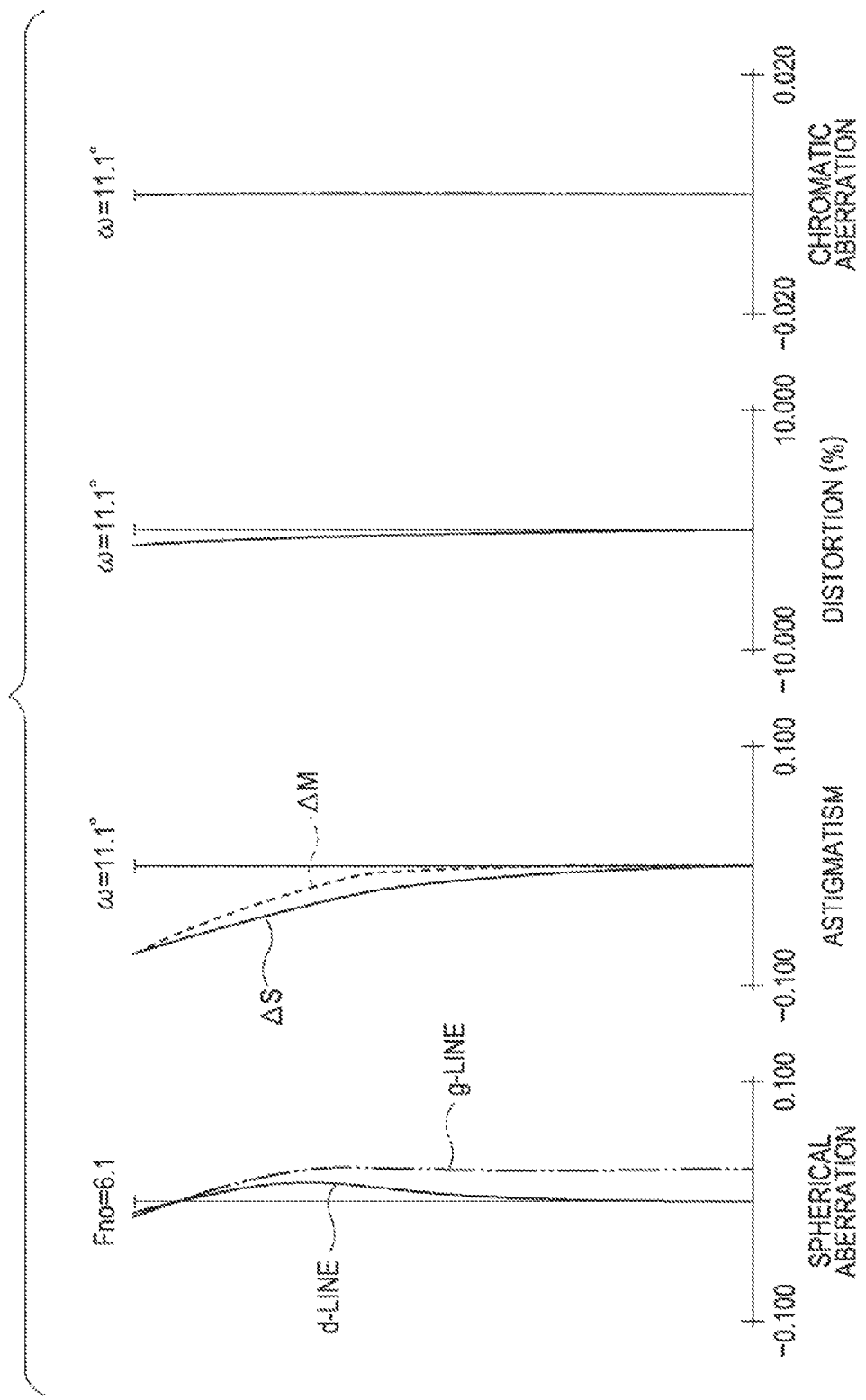

ZOOM LENS AND IMAGE PICKUP APPARATUS USING THE SAME

BACKGROUND OF THE INVENTION

1. Field of the Invention

The present invention relates to a zoom lens suitable for use in an image pickup apparatus such as a digital still camera, a video camera, a film camera, a TV camera, or a surveillance camera.

2. Description of the Related Art

In recent years, image pickup apparatuses (cameras), such as a video camera and a digital still camera, using a solid-state image pickup element have been sophisticated and reduced in size. As an optical system for use in the image pickup apparatuses, there is a demand for a compact zoom lens having a wide viewing angle, and a high zoom ratio. A negative lead type zoom lens is known as a zoom lens that meets this demand. In a negative lead type zoom lens, a lens unit having a negative refractive power is provided—with respect to the image pickup element (image side)—closest to an object to be photographed (object side).

As a negative lead type zoom lens, U.S. Pat. Nos. 7,215,482, 7,450,318, and 7,295,381 disclose compact three-unit zoom lenses each including, in order from an object side to an image side, a first lens unit having a negative refractive power, a second lens unit having a positive refractive power, and a third lens unit having a positive refractive power. In the zoom lenses of the above-referenced patents, the first lens unit having a negative refractive power consists of two lenses, that is, a negative lens and a positive lens.

To reduce the total size of the zoom lens and to increase the zoom ratio, it is generally effective to reduce the number of lenses in the lens units of the zoom lens and to increase the refractive powers of the lens units. Unfortunately, if the refractive powers of the lens units are simply increased for a higher zoom ratio, aberration variation increases during zooming, and it is therefore difficult to achieve a high optical performance over the entire zoom range. Although the viewing angle can be increased while properly correcting aberrations by increasing the number of lenses in the lens units, this increases the total size of the zoom lens.

For this reason, to achieve a compact size, a wide viewing angle, and a high zoom ratio in the negative lead type three-unit zoom lens, it is important to appropriately set the lens configurations and refractive powers of the lens units. In particular, the lens configuration and refractive power of the first lens unit having a negative refractive power are important.

SUMMARY OF THE INVENTION

A zoom lens according to an aspect of the present invention includes a first lens unit having a negative refractive power; a second lens unit having a positive refractive power; and a third lens unit having a positive refractive power. The first lens unit, the second lens unit, and the third lens unit are arranged in order from an object side to an image side. Distances between the first, second, and third lens units change during zooming. The first lens unit consists of two lenses. The following conditions are satisfied:

$-0.62 < f1/ft < -0.20$ $-0.39 < (R2r-R1f)/(R2r+R1f) < 0.36$ where R1f and R2r respectively represent radii of curvature of a lens surface closest to the object side in the first lens unit and a lens surface closest to the image side in the first lens unit, f1 represents a focal length of the first lens unit, and ft represents a focal length of the entire zoom lens at a telephoto end.

According to at least one embodiment of the present invention, it is possible to obtain a zoom lens having a compact lens system, a wide viewing angle, a high zoom ratio, and a high optical performance.

Further features of the present invention will become apparent to a person of ordinary skill on the art from the following description of exemplary embodiments with reference to the attached drawings.

BRIEF DESCRIPTION OF THE DRAWINGS

FIG. 1 is a cross-sectional view of lenses in a zoom lens at a wide angle end according to a first embodiment.

FIGS. 2A and 2B are aberration diagrams of the zoom lens of the first embodiment, respectively, at the wide angle end and a telephoto end.

FIGS. 4A and 4B are aberration diagrams of the zoom lens of the second embodiment, respectively, at the wide angle end and a telephoto end.

FIGS. 6A and 6B are aberration diagrams of the zoom lens of the third embodiment, respectively, at the wide angle end and a telephoto end.

FIGS. 8A and 8B are aberration diagrams of the zoom lens of the fourth embodiment, respectively, at the wide angle end and a telephoto end.

DESCRIPTION OF THE EMBODIMENTS

A zoom lens according to the present invention includes a first lens unit having a negative refractive power, a second lens unit having a positive refractive power, and a third lens unit having a positive refractive power. The first lens unit, the second lens unit, and the third lens unit are arranged in order from an object side to an image side. During zooming, the first and second lens units independently move or all of the lenses independently move so as to change the distances between the lens units. Focusing is performed by moving the third lens unit. In the zoom lens of the present invention, in addition to the above-described three lens units, a lens unit having a refractive power may be provided on one of an object side of the first lens unit and an image side of the third lens unit.

Figure 3:
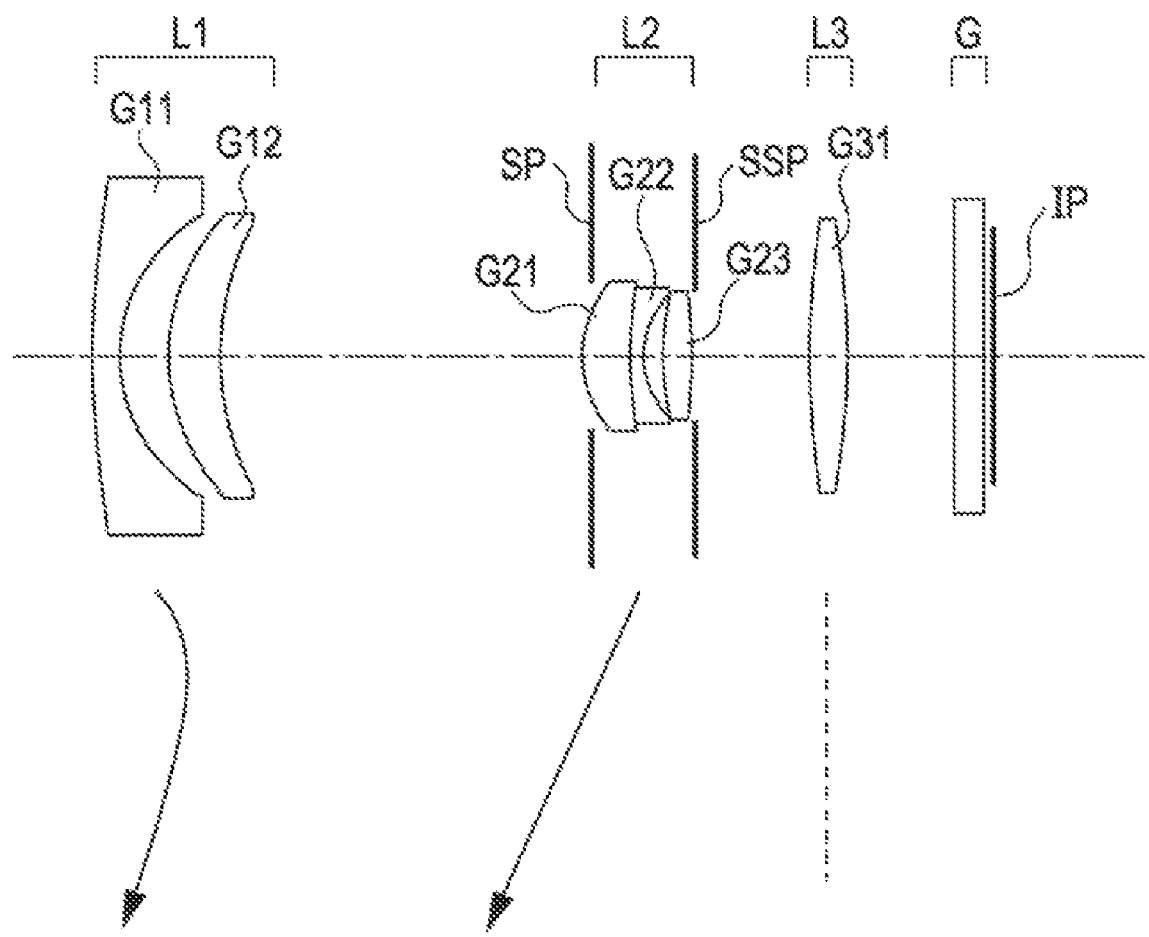
FIG. 3 is a cross-sectional view of lenses in a zoom lens at a wide angle end according to a second embodiment.
Figure 5:
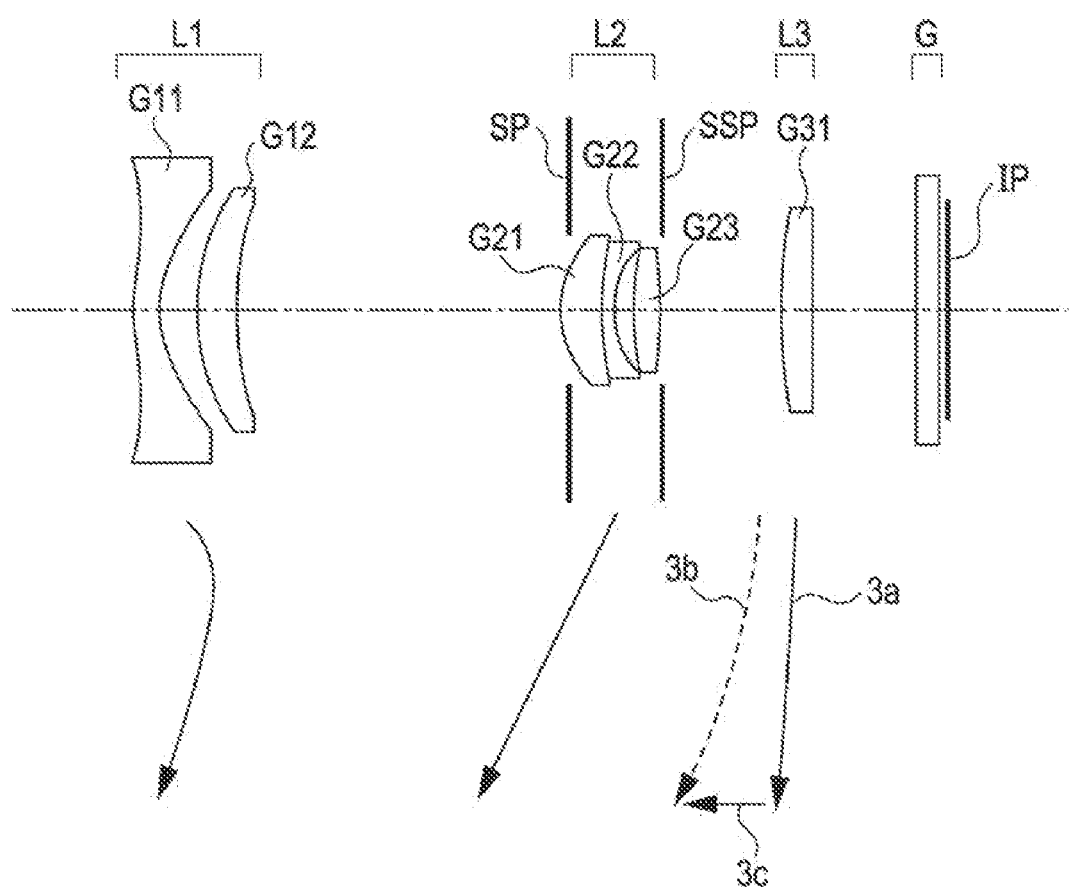
FIG. 5 is a cross-sectional view of lenses in a zoom lens at a wide angle end according to a third embodiment.
Figure 7:
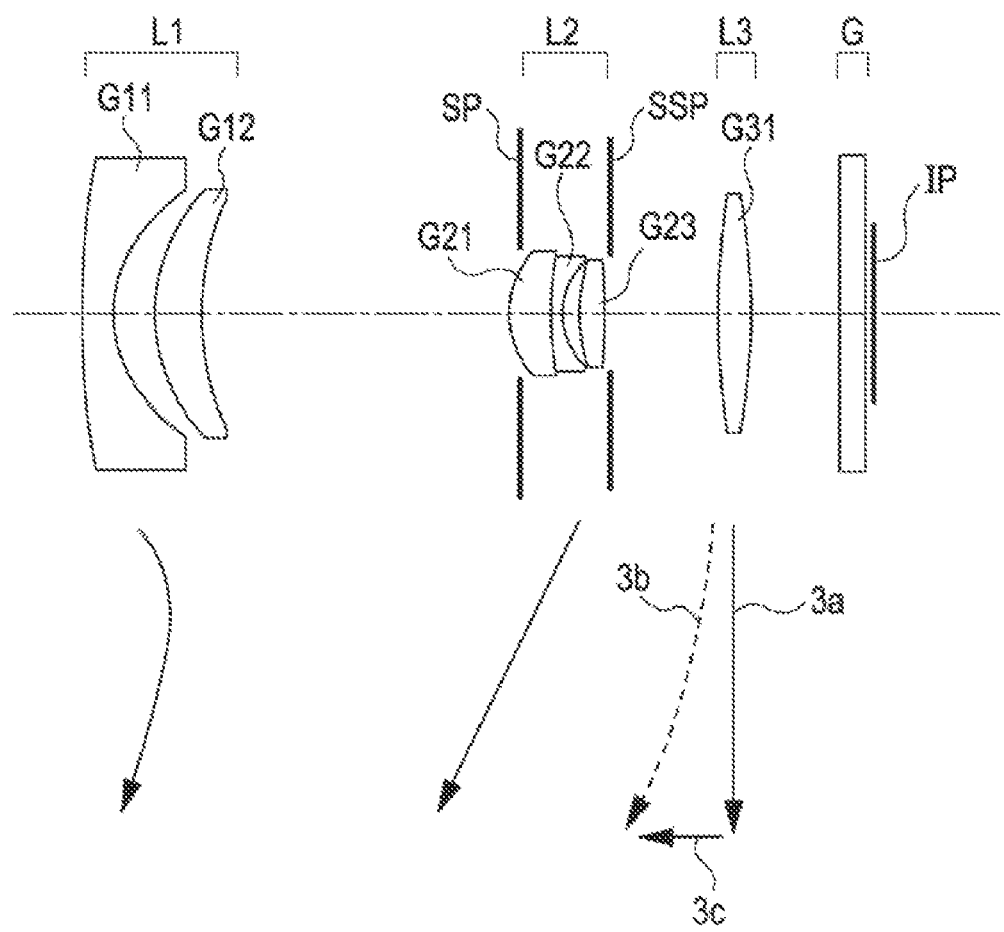
FIG. 7 is a cross-sectional view of lenses in a zoom lens at a wide angle end according to a fourth embodiment.
Figure 9:
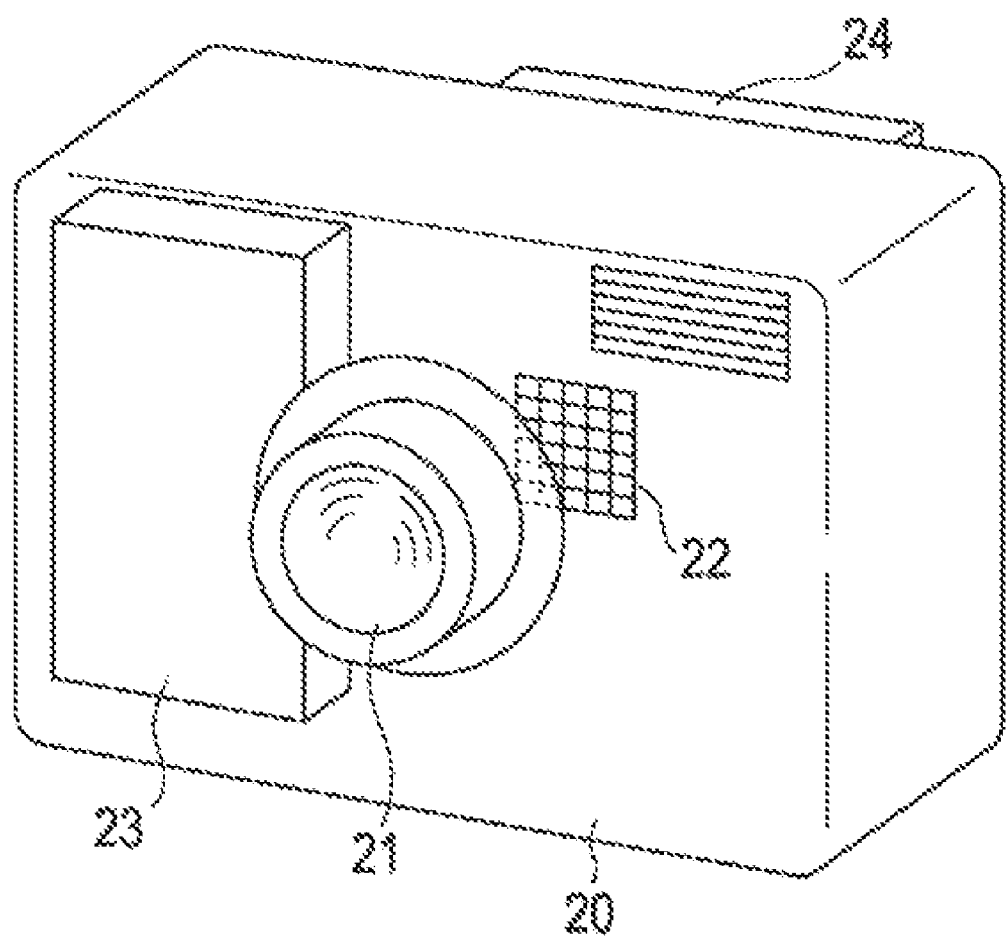
FIG. 9 is a schematic view illustrating the principal part of an image pickup apparatus according to the present invention.

FIG. 1 is a cross-sectional view of lenses in a zoom lens at a wide angle end (short focal-length end) according to a first embodiment of the present invention. FIGS. 2A and 2B are aberration diagrams of the zoom lens of the first embodiment, respectively, at the wide angle end and a telephoto end (long focal-length end). The zoom lens of the first embodiment has a zoom ratio of about 3.90 and an aperture ratio of about 2.88 to 6.10. FIG. 3 is a cross-sectional view of lenses in a zoom lens at a wide angle end according to a second embodiment of the present invention. FIGS. 4A and 4B are aberration diagrams of the zoom lens of the second embodiment, respectively, at the wide angle end and a telephoto end. The zoom lens of the second embodiment has a zoom ratio of about 3.91 and an aperture ratio of about 2.88 to 6.07. FIG. 5 is a cross-sectional view of lenses in a zoom lens at a wide angle end according to a third embodiment of the present invention. FIGS. 6A and 6B are aberration diagrams of the zoom lens of the third embodiment, respectively, at the wide angle end and a telephoto end. The zoom lens of the third embodiment has a zoom ratio of about 3.93 and an aperture ratio of about 2.88 to 6.17. FIG. 7 is a cross-sectional view of lenses in a zoom lens at a wide angle end according to a fourth embodiment of the present invention. FIGS. 8A and 8B are aberration diagrams of the zoom lens of the fourth embodiment, respectively, at the wide angle end and a telephoto end. The zoom lens of the fourth embodiment has a zoom ratio of about 3.83 and an aperture ratio of about 2.87 to 6.10. FIG. 9 is a schematic view illustrating parts of a digital still camera (image pickup apparatus) including the zoom lens of the present invention. The zoom lenses of the embodiments described herein are imaging lens systems for use in image pickup apparatuses. However, the disclosed zoom lenses are not limited to the uses described herein. In the lens cross-sectional view, the left side is an object side (front side), and the right side is an image side (rear side). When the zoom lenses of the embodiments are used in optical apparatuses such as a projector, the left side is a screen side, and the right side is a projection image side.

In the lens cross-sectional views, L1 represents a first lens unit having a negative refractive power (optical power=the reciprocal of the focal length), L2 represents a second lens unit having a positive refractive power, and L3 represents a third lens unit having a positive refractive power. An f-number determining member SP functions as an aperture stop that determines (limits) an open f-number (Fno) light beam (hereinafter also referred to as an aperture stop). SSP represents a flare-cut stop. An optical block G corresponds to an optical filter, a face plate, a crystal low-pass filter, or an infrared cut-off filter. When the zoom lens is used as an imaging optical system of a video camera or a digital still camera, an image plane IP corresponds to an image pickup surface of a solid-state image pickup element (photoelectric conversion element, image pickup element), such as a CCD sensor or a CMOS sensor, that receives light and forms an image. In spherical aberration diagrams of the aberration diagrams, a d-line and a g-line are shown, and Fno represents the f-number. In astigmatism diagrams, $\Delta M$ and $\Delta S$ respectively represent a meridional image plane and a sagittal image plane. Lateral chromatic aberration is represented by the g-line, and co represents the half field angle. In the following embodiments, the wide angle end and the telephoto end refer to zoom positions provided when the zooming lens unit (second lens unit L2) is positioned at opposite ends of a mechanical movable range on the optical axis. In the lens cross-sectional views, arrows indicate moving paths of the lens units during zooming from the wide angle end to the telephoto end or moving directions of the lens units during focusing; a dashed line without an arrow indicates that the lens unit does not move during zooming.

In the first and second embodiments shown in FIGS. 1 and 3, in case of zooming from the wide angle end to the telephoto end, the first lens unit L1 moves to the image side along a convex path, and the second lens unit L2 monotonously moves to the object side. The third lens unit L3 does not move for zooming. In the zoom lenses of the first and second embodiments, zooming is mainly performed by moving the second lens unit L2, and an image plane variation due to zooming is corrected by moving the first lens unit L1 along the convex path towards the image side. In this case, the first and second lens units move so that the distance therebetween is shorter at the telephoto end than at the wide angle end. Focusing from an object at infinity to a near object is performed by moving the third lens unit L3 to the object side.

In the third and fourth embodiments shown in FIGS. 5 and 7, in case of zooming from the wide angle end to the telephoto end, the first lens unit L1 substantially reciprocates along a part of a convex path so as to correct an image plane variation due to zooming, and the second lens unit L2 monotonously moves to the object side so as to perform main zooming. The third lens unit L3 monotonously moves to the object side, or moves along a part of a convex path to the image side. In this case, the lens units move during zooming from the wide angle end to the telephoto end so that the distance between the first lens unit L1 and the second lens unit L2 decreases and the distance between the second lens unit L2 and the third lens unit L3 increases. Further, a rear focus method in which focusing is performed by moving the third lens unit L3 on the optical axis is adopted. A solid curve 3a and a dashed curve 3b relating to the third lens unit L3 represent moving paths along which the third lens unit L3 moves to correct an image plane variation due to zooming when the focus is on the object at infinity and the near object, respectively. In case of focusing from the object at infinity to the near object at the telephoto end, the third lens unit L3 is moved toward the front side (object side), as shown by arrow 3c. While the first lens unit L1 does not move along the optical axis for focusing in the embodiments, it may move to correct aberration, as required.

In the embodiments, an image blur caused when vibration is transmitted to the zoom lens is corrected by moving the entire second lens unit L2 so as to have a component in a direction perpendicular to the optical axis. In other words, an object image is displaced in the direction perpendicular to the optical axis. In this case, an image blur may be corrected by displacing a part of the second lens unit L2, instead of displacing the entire second lens unit L2.

In the zoom lenses of the embodiments, the first lens unit having a negative refractive power, the second lens unit having a positive refractive power, and the third lens unit having a positive refractive power are arranged in that order from the object side to the image side in order to achieve a wide viewing angle, a high zoom ratio, and a short total lens length.

Here, the total lens length refers to a distance from a first lens surface to the image plane. Zooming is performed by changing the distances between the lens units. The first lens unit consists of two lenses, that is, the number of lenses is minimized to shorten the total lens length while reducing spherical aberration and curvature of field.

The focal length of the first lens unit L1 is set to be relatively shorter than the focal length of the entire lens system at the telephoto end. This shortens the distance between the first lens unit L1 and the second lens unit L2, reduces the moving amounts of the lens units during zooming from the wide angle end to the telephoto end, and reduces the effective diameter of the lens closest to the object side.

In correspondence to the shortened focal length of the first lens unit L1, there is a need to shorten the focal length of the negative lens in the first lens unit L1. However, if the focal length of the negative lens is shortened, it is difficult to correct both spherical aberration and curvature of field at the telephoto end. As a result, it is difficult to form the first lens unit L1 by two lenses.

Accordingly, in the embodiments, the radius of curvature of the lens surface closest to the object side in the first lens unit L1 is set to be close to the radius of curvature of the lens surface closest to the image side. This can properly correct curvature of field and spherical aberration by the lens surface closest to the object side. More specifically, in the embodiments, the following conditional expressions are satisfied:

$$-0.62 < fl/ft < -0.20 \quad (1)$$

$$-0.39 < (R2r-R1f)/(R2r+R1f) < 0.36 \quad (2)$$

where R1f and R2r represent the radii of curvature of the lens surface closest to the object side and the lens surface closest to the image side in the first lens unit L1, fl represents the focal length of the first lens unit L1, and ft represents the focal length of the entire system at the telephoto end.

Conditional Expression (1) specifies a preferred range of the focal length of the first lens unit L1 with respect to the focal length of the entire system at the telephoto end. When the value falls below the lower limit in Conditional Expression (1), the negative focal length of the first lens unit L1 is too long. For this reason, long moving distances of the lens units for zooming are necessary in order to achieve a wide viewing angle or a high zoom ratio. This increases the size of the lens system. In contrast, when the value exceeds the upper limit in Conditional Expression (1), the negative focal length of the first lens unit L1 is too short. For this reason, the negative Petzval sum in the first lens unit L1 increases, and curvature of field becomes too large to be corrected.

Conditional Expression (2) specifies the shapes of the lenses in the first lens unit L1. When the value falls below the lower limit in Conditional Expression (2), the radius curvature of the lens surface closest to the object side in the first lens unit L1 is excessively larger than the radius of curvature of the lens surface closest to the image side. As a result, negative spherical aberration at the telephoto end becomes too large to be corrected. In contrast, when the value exceeds the upper limit in Conditional Expression (2), the radius of curvature of the lens surface closest to the object side in the first lens unit L1 is excessively smaller than the radius of curvature of the lens surface closest to the image side. As a result, positive curvature of field becomes too large to be corrected.

More preferably, the ranges in Conditional Expressions (1) and (2) are set as follows:

$$-0.60 < fl/ft < -0.50 \quad (1a)$$

$$-0.30 < (R2r-R1f)/(R2r+R1f) < 0.00 \quad (2a)$$

In the embodiments, the total size of the lens system is reduced by providing the lens units with the above-described structures in the embodiments, and a wide viewing angle, a high zoom ratio, and a high optical performance are obtained with a simple lens configuration. In order to obtain a further higher optical performance or to reduce the total size of the lens system in the zoom lenses of the embodiments, it is preferable to satisfy one of the following conditions. This achieves an advantage corresponding to the condition.

At least one of the following conditional expressions is satisfied:

$$-2.8 < fG2/fG1 < -2.4 \quad (3)$$

$$-0.33 < (R2f-R1r)/(R2f+R1r) < 0.33 \quad (4)$$

$$1.880 < (Nd1+Nd2)/2 < 2.500 \quad (5)$$

where fG1 and fG2 represent focal lengths of an object-side lens G11 and an image-side lens G12 in the first lens unit L1, R1r represents the radius of curvature of an image-side lens surface of the object-side lens G11 in the first lens unit L1, R2f represents the radius of curvature of an object-side lens surface of the image-side lens G12 in the first lens unit L1, and Nd1 and Nd2 represent the refractive indices of the materials of the object-side lens G11 and the image-side lens G12 in the first lens unit L1 with respect to the d-line.

When the value falls below the lower limit in Conditional Expression (3), the focal length fG2 of the image-side positive lens G12 in the first lens unit L1 is long with respect to the focal length fG1 of the object-side negative lens in the first lens unit L1. As a result, negative spherical aberration becomes too large to be corrected at the telephoto end. In contrast, when the value exceeds the upper limit in Conditional Expression (3), the focal length fG2 of the image-side positive lens G12 is short with respect to the focal length fG1 of the object-side negative lens G11 in the first lens unit L1. As a result, positive curvature of field becomes too large to be corrected. It is more preferable to set the numerical range in Conditional Expression (3) as follows:

$$-2.7 < fG2/fG1 < -2.6 \quad (3a)$$

Conditional Expression (4) specifies the shape of an air lens defined by the two lenses G11 and G12 of the first lens unit L1. When the value falls below the lower limit in Conditional Expression (4), the radius of curvature R2f of an image-side lens surface of the air lens is excessively larger than the radius of curvature R1r of an object-side lens surface, and positive curvature of field becomes too large to be corrected. In contrast, when the value exceeds the upper limit in Conditional Expression (4), the radius of curvature R2f of the image-side lens surface of the air lens becomes excessively smaller than the radius of curvature R1f of the objet-side lens surface, and negative spherical aberration becomes too large to be corrected. It is more preferable to set the numerical range in Conditional Expression (4) as follows:

$$0.00 < (R2f-R1r)/(R2f+R1r) < 0.23 \quad (4a)$$

Conditional Expression (5) specifies a refractive index Nd1 of the material of the object-side lens G11 of the first lens unit L1 with respect to the d-line, and a refractive index Nd2 of the image-side lens G12 with respect to the d-line. When Conditional Expression (5) is satisfied, the radii of curvature of the lens surfaces can be increased even when the focal length of the first lens unit L1 is decreased, and therefore, spherical aberration and coma aberration can be corrected easily. It is more preferable to set the numerical range in Conditional Expression (5) as follows:

$$1.885 < (Nd1+Nd2)/2 < 2.000 \quad (5a)$$

According to the embodiments having the above-described configurations, a three-unit zoom lens having a wide viewing angle and a high zoom ratio of 3.5 or more can have a high optical performance even when the number of lenses is small. In the embodiments, it is preferable that the object-side lens in the first lens unit L1 be aspherical such that the positive refractive power decreases from the center toward the periphery. This allows positive curvature of field to be effectively suppressed at a large image height. It is preferable that the second lens unit L2 consists of three lenses. This allows longitudinal chromatic aberration to be properly corrected over the entire zoom range even when the positive focal length of the second lens unit L2 decreases or the moving amount of the second lens unit L2 during zooming increases. It is not desirable to form the second lens unit L2 by four or more lenses, because this increases the total lens length.

A description will now be given of lens configurations of the zoom lenses of the embodiments. In the embodiments, the first lens unit L1 having a negative refractive power consists of two lenses. More specifically, L1 consists of a meniscus negative lens G11 having a convex surface on the object side and a meniscus positive lens G12 having a convex surface on the object side. The meniscus negative lens G11 has an object-side lens surface and an image-side lens surface that are aspherical such that positive and refractive powers thereof decrease from the lens center to the periphery. The second lens unit L2 consists of a cemented lens in which a positive lens G21 having a convex surface on the object side and a negative lens G22 having a concave surface on the image side are joined, and a positive lens G23 in order from the object side to the image side. An object-side surface of the positive lens G21 is aspherical so as to properly correct spherical aberration and coma aberration. The third lens unit L3 consists of one positive lens G31. As described above, the configurations of the lens units, particularly, the shapes of the lenses in the first lens unit and the powers of the lens units are set appropriately. This achieves a wide viewing angle, a high zoom ratio of about 3 to 4, a compact size, and a high optical performance.

Next, a description will be given of an example of a digital still camera (image pickup apparatus, optical apparatus) using the zoom lens of the present invention as an imaging optical system, with reference to FIG. 9. Referring to FIG. 9, a digital still camera includes a camera body 20, an imaging optical system 21 formed by the zoom lens of the present invention, a solid-state image pickup element (photoelectric conversion element) 22, such as a CCD sensor or a CMOS sensor, incorporated in the camera body 20 so as to receive an object image formed by the imaging optical system 21, a memory 23 for storing information about the object image photoelectrically converted by the image pickup element 22, and a viewfinder 24 formed by a liquid crystal display panel or the like. The object image formed on the solid-state image pickup element 22 is viewed through the viewfinder 24. To correct barrel-shaped distortion, which is likely to be caused at the wide angle end, by enlarging the image by image processing, it is preferable that the effective image circle diameter (diameter of image circle) at the wide angle end be smaller than the effective image circle diameter at the telephoto end. By thus applying the zoom lens of the present invention to the image pickup apparatus such as a digital still camera, a compact image pickup apparatus having the effective image circle diameter at the wide angle end smaller than the effective image circle diameter at the telephoto end, and a high optical performance is realized.

Numerical examples of the present invention will now be described. In the numerical examples, i represents the order number of the lens surface from the object side, ri represents the radius of curvature of the lens surface, di represents the lens thickness and air gap between the i-th lens surface and the i+1-th lens surface, and ndi and vdi respectively represent the refractive index and the Abbe number for the d-line. Further, "*" indicates that the lens surface is aspherical, r5 represents the aperture stop SP, and r11 represents the flare-cut stop SSP. Two surfaces closest to the image side are formed by glass materials such as face plates, and are indicated as a fourth lens unit in the numerical examples. Further, k, A4, A6, A8, and A10 are aspherical coefficients. The aspherical shape is given by the following expression:

$$x = (h^2/R)/[1+\{1-(1+k)(h/R)^2\}^{1/2}] + A4 \cdot h^4 + A6 \cdot h^6 + A8 \cdot h^8 + A10 \cdot h^{10}$$

where x represents the displacement in the optical axis direction at a height h from the optical axis with reference to the vertex of the surface.

In the above expression, R represents the paraxial radius of curvature, and "e-X" means "$10^{-X}$". The relationships between the above-described conditional expressions and the numerical examples are shown in Table 1. In the numerical examples, the value of d5 is negative because the F-number determining member and a twenty-first lens G21 of the second lens unit L2 are counted in order from the object side. More specifically, this means that the F-number determining member (aperture stop) SP is located closer to the image side by an absolute value d5 than the object-side vertex of the lens surface of the twenty-first lens G21 on the object side of the second lens unit L2.

First Numerical Example

Unit: mm

Surface Data

| Surface No. | r | d | nd | vd |
|---|---|---|---|---|
| 1* | 18.709 | 1.10 | 1.84954 | 40.1 |
| 2* | 4.538 | 1.77 | | |
| 3 | 7.172 | 1.90 | 1.92286 | 18.9 |
| 4 | 10.392 | (variable) | | |
| 5 (stop) | ∞ | −0.30 | | |
| 6* | 4.015 | 1.70 | 1.84954 | 40.1 |
| 7 | 14.802 | 0.50 | 1.80809 | 22.8 |
| 8 | 3.345 | 0.68 | | |
| 9 | 9.704 | 1.05 | 1.77250 | 49.6 |
| 10 | −25.626 | 0.10 | | |
| 11 | ∞ | (variable) | | |
| 12 | 36.473 | 1.40 | 1.60311 | 60.6 |
| 13 | −24.994 | (variable) | | |
| 14 | ∞ | 1.00 | 1.51633 | 64.1 |
| 15 | ∞ | 0.50 | | |
| Image plane | ∞ | | | |

Aspherical Surface Data

First Surface k = −6.25496e+001　　A4 = −3.26330e−004　　A6 = 1.21318e−005
A8 = −1.15618e−007　　A10 = 2.90934e−010

Second Surface k = −2.98511e+000　　A4 = 1.55377e−003　　A6 = −1.45275e−005
A8 = 4.52973e−007　　A10 = 1.66565e−008

Sixth Surface k = −8.99768e−001　　A4 = 1.19553e−003　　A6 = 1.35242e−005
A8 = 4.22012e−006　　A10 = −1.90053e−007

Various Data
Zoom ratio 3.90

| | | | | | |
|---|---|---|---|---|---|
| Focal length | 5.19 | 12.73 | 20.28 | 8.96 | 16.51 |
| F-number | 2.88 | 4.47 | 6.10 | 3.67 | 5.29 |
| Viewing angle | 33.21 | 16.92 | 10.82 | 21.33 | 13.21 |
| Image height | 3.40 | 3.88 | 3.88 | 3.50 | 3.88 |
| Total lens length | 32.62 | 29.99 | 34.85 | 29.19 | 32.13 |
| BF | 4.13 | 4.13 | 4.13 | 4.13 | 4.13 |
| d4 | 13.24 | 3.17 | 0.59 | 6.09 | 1.58 |
| d11 | 5.34 | 12.79 | 20.23 | 9.06 | 16.51 |
| d13 | 2.97 | 2.97 | 2.97 | 2.97 | 2.97 |

Zoom Lens Unit Data

| Unit | First surface | Focal length |
|---|---|---|
| 1 | 1 | −11.55 |
| 2 | 5 | 9.34 |
| 3 | 12 | 24.80 |
| 4 | 14 | ∞ |

Second Numerical Example

Unit: mm

Surface Data

| Surface No. | r | d | nd | vd |
|---|---|---|---|---|
| 1* | 18.824 | 1.00 | 1.84954 | 40.1 |
| 2* | 4.576 | 1.67 | | |
| 3 | 7.068 | 2.00 | 1.92286 | 18.9 |
| 4 | 10.170 | (variable) | | |
| 5 (stop) | ∞ | −0.30 | | |
| 6* | 4.010 | 1.70 | 1.84954 | 40.1 |
| 7 | 14.951 | 0.50 | 1.80809 | 22.8 |
| 8 | 3.353 | 0.68 | | |
| 9 | 9.515 | 1.00 | 1.77250 | 49.6 |
| 10 | −28.740 | 0.10 | | |
| 11 | ∞ | (variable) | | |
| 12 | 35.056 | 1.30 | 1.60311 | 60.6 |
| 13 | −26.345 | (variable) | | |
| 14 | ∞ | 1.00 | 1.51633 | 64.1 |
| 15 | ∞ | 0.50 | | |
| Image plane | ∞ | | | |

Aspherical Surface Data

First Surface k = −6.25496e+001  A4 = −3.26308e−004  A6 = 1.21319e−005
A8 = −1.15617e−007  A10 = 2.90934e−010

Second Surface k = −2.98511e+000  A4 = 1.55377e−003  A6 = −1.45275e−005
A8 = 4.52972e−007  A10 = 1.66565e−008

Sixth Surface k = −8.99768e−001  A4 = 1.19555e−003  A6 = 1.35242e−005
A8 = 4.22012e−006  A10 = −1.90053e−007

Various Data
Zoom ratio 3.91

| Focal length | 5.13 | 12.58 | 20.04 | 8.86 | 16.31 |
|---|---|---|---|---|---|
| F-number | 2.88 | 4.48 | 6.07 | 3.68 | 5.27 |
| Viewing angle | 33.54 | 17.11 | 10.94 | 21.56 | 13.36 |
| Image height | 3.40 | 3.88 | 3.88 | 3.50 | 3.88 |
| Total lens length | 31.97 | 29.73 | 34.84 | 28.77 | 32.00 |
| BF | 5.02 | 5.01 | 5.01 | 5.01 | 5.01 |
| d4 | 13.10 | 3.21 | 0.68 | 6.08 | 1.66 |
| d11 | 4.21 | 11.86 | 19.50 | 8.03 | 15.68 |
| d13 | 3.86 | 3.85 | 3.85 | 3.85 | 3.85 |

Zoom Lens Unit Data

| Unit | First surface | Focal length |
|---|---|---|
| 1 | 1 | −11.62 |
| 2 | 5 | 9.36 |
| 3 | 12 | 25.14 |
| 4 | 14 | ∞ |

Third Numerical Example

Unit: mm

Surface Data

| Surface No. | r | d | nd | vd |
|---|---|---|---|---|
| 1* | 14.025 | 1.00 | 1.84954 | 40.1 |
| 2* | 4.307 | 1.50 | | |
| 3 | 8.432 | 1.65 | 1.92286 | 18.9 |
| 4 | 13.747 | (variable) | | |
| 5 (stop) | ∞ | −0.30 | | |
| 6* | 4.094 | 1.70 | 1.84954 | 40.1 |
| 7 | 14.360 | 0.50 | 1.80809 | 22.8 |
| 8 | 3.553 | 0.80 | | |
| 9 | 12.687 | 1.10 | 1.77250 | 49.6 |
| 10 | −22.698 | 0.10 | | |
| 11 | ∞ | (variable) | | |
| 12 | 25.054 | 1.30 | 1.60311 | 60.6 |
| 13 | 166.191 | (variable) | | |
| 14 | ∞ | 1.00 | 1.51633 | 64.1 |
| 15 | ∞ | 0.50 | | |
| Image plane | ∞ | | | |

Aspherical Surface Data

First Surface k = −3.96866e+001  A4 = −8.54999e−004  A6 = 1.02162e−005
A8 = −6.66055e−008  A10 = 2.90934e−010

Second Surface k = −3.56714e+000  A4 = 1.18808e−003  A6 = −5.20546e−005
A8 = 5.33892e−007  A10 = 1.66565e−008

Sixth Surface k = −9.55343e−001  A4 = 1.14490e−003  A6 = 1.05381e−005
A8 = 3.96259e−006  A10 = −1.90053e−007

Various Data
Zoom ratio 3.93

| Focal length | 6.05 | 15.12 | 23.79 | 10.63 | 19.50 |
|---|---|---|---|---|---|
| F-number | 2.88 | 4.52 | 6.17 | 3.69 | 5.35 |
| Viewing angle | 29.42 | 14.38 | 9.25 | 18.22 | 11.24 |
| Image height | 3.40 | 3.88 | 3.88 | 3.50 | 3.88 |
| Total lens length | 33.43 | 31.12 | 36.88 | 29.95 | 33.70 |
| BF | 5.46 | 6.52 | 7.58 | 5.99 | 7.05 |
| d4 | 13.70 | 3.04 | 0.44 | 6.04 | 1.44 |
| d11 | 4.93 | 12.22 | 19.51 | 8.57 | 15.86 |
| d13 | 4.30 | 5.36 | 6.42 | 4.83 | 5.89 |

Zoom Lens Unit Data

| Unit | First surface | Focal length |
|---|---|---|
| 1 | 1 | −12.32 |
| 2 | 5 | 9.88 |
| 3 | 12 | 48.75 |
| 4 | 14 | ∞ |

Fourth Numerical Example

Unit: mm

Surface Data

| Surface No. | r | d | nd | vd |
|---|---|---|---|---|
| 1* | 25.057 | 1.25 | 1.84954 | 40.1 |
| 2* | 4.772 | 1.63 | | |
| 3 | 7.282 | 1.90 | 1.92286 | 18.9 |
| 4 | 11.104 | (variable) | | |
| 5 (stop) | ∞ | −0.50 | | |
| 6* | 4.009 | 1.70 | 1.84954 | 40.1 |
| 7 | 15.418 | 0.50 | 1.80809 | 22.8 |
| 8 | 3.345 | 0.68 | | |
| 9 | 9.832 | 1.05 | 1.77250 | 49.6 |
| 10 | −25.356 | 0.15 | | |
| 11 | ∞ | (variable) | | |
| 12 | 40.803 | 1.40 | 1.60311 | 60.6 |

-continued

Unit: mm

| | | | | |
|---|---|---|---|---|
| 13 | −23.082 | (variable) | | |
| 14 | ∞ | 1.00 | 1.51633 | 64.1 |
| 15 | ∞ | 0.50 | | |
| Image plane | ∞ | | | |

Aspherical Surface Data

First Surface k = −1.00455e+002  A4 = −2.87034e−004  A6 = 1.09221e−005
A8 = −1.09330e−007  A10 = 2.18836e−010

Second Surface k = −2.90456e+000  A4 = 1.50884e−003  A6 = −1.55942e−005
A8 = 7.48056e−007  A10 = 3.24702e−009

Sixth Surface k = −8.99595e−001  A4 = 1.17592e−003  A6 = 1.59749e−005
A8 = 4.25349e−006  A10 = −2.13506e−007

Various Data
Zoom ratio 3.83

| | | | | | |
|---|---|---|---|---|---|
| Focal length | 5.14 | 12.42 | 19.70 | 8.79 | 16.06 |
| F-number | 2.87 | 4.45 | 6.10 | 3.67 | 5.25 |
| Viewing angle | 33.29 | 17.32 | 11.13 | 23.79 | 13.56 |
| Image height | 3.37 | 3.88 | 3.88 | 3.88 | 3.88 |
| Total lens length | 32.09 | 29.83 | 34.57 | 29.07 | 31.90 |
| BF | 4.80 | 4.51 | 4.55 | 4.50 | 4.52 |
| d4 | 13.14 | 3.47 | 0.88 | 6.37 | 1.88 |
| d11 | 4.38 | 12.09 | 19.38 | 8.45 | 15.74 |
| d13 | 3.64 | 3.35 | 3.39 | 3.34 | 3.36 |

Zoom Lens Unit Data

| Unit | First surface | Focal length |
|---|---|---|
| 1 | 1 | −11.57 |
| 2 | 5 | 9.35 |
| 3 | 12 | 24.65 |
| 4 | 14 | ∞ |

TABLE 1

| Conditional Expression | First example | Second example | Third example | Fourth example |
|---|---|---|---|---|
| (1) fl/ft | −0.570 | −0.580 | −0.518 | −0.587 |
| (2) (R2r − R1f)/(R2r + R1f) | −0.286 | −0.298 | −0.010 | −0.380 |
| (3) fG2/fG1 | −2.672 | −2.607 | −2.678 | −2.592 |
| (4) (R2f − R1r)/(R2f + R1r) | 0.225 | 0.214 | 0.324 | 0.208 |
| (5) (Ndi + Nd2)/2 | 1.8862 | 1,8862 | 1.8862 | 1.8862 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-161758 filed Jul. 8, 2009, which is hereby incorporated by reference herein in its entirety.

What is claimed is:

1. A zoom lens consisting of:
a first lens unit having a negative refractive power;
a second lens unit having a positive refractive power; and
a third lens unit having a positive refractive power,
wherein the first lens unit, the second lens unit, and the third lens unit are arranged in order from an object side to an image side,
wherein distances between the first, second, and third lens units change during zooming,
wherein the first lens unit consists of two lenses, and
wherein the following conditions are satisfied:

$$-0.587 \leq fl/ft < -0.20$$

$$-0.39 < (R2r - R1f)/(R2r + R1f) < 0.36$$

where R1f and R2r represent radii of curvature of a lens surface closest to the object side in the first lens unit and a lens surface closest to the image side in the first lens unit, fl represents a focal length of the first lens unit, and ft represents a focal length of the entire zoom lens at a telephoto end.

2. The zoom lens according to claim 1, wherein the following conditional expression is satisfied:

$$-2.8 < fG2/fG1 < -2.4$$

where fG1 and fG2 represent focal lengths of an object-side lens and an image-side lens in the first lens unit.

3. The zoom lens according to claim 1, wherein the following conditional expression is satisfied:

$$-0.33 < (R2f - R1r)/(R2f + R1r) < 0.33$$

where R1r represents a radius of curvature of an image-side lens surface of an object-side lens in the first lens unit, and R2f represents a radius of curvature of an object-side lens surface of an image-side lens in the first lens unit.

4. The zoom lens according to claim 1, wherein the following condition is satisfied:

$$1.880 < (Nd1 + Nd2)/2 < 2.500$$

where Nd1 and Nd2 represent refractive indices of materials of an object-side lens and an image-side lens in the first lens unit with respect to a d-line.

5. The zoom lens according to claim 1, wherein the lens surface closest to the object side in the first lens unit is aspherical such that a positive refractive power decreases from a lens center to a lens periphery.

6. The zoom lens according to claim 1, wherein the second lens unit consists of three lenses.

7. The zoom lens according to claim 1, wherein an object image is displaced in a direction perpendicular to an optical axis by moving the second lens unit so as to have a component in the direction perpendicular to the optical axis.

8. An image pickup apparatus comprising:
a zoom lens; and
an image pickup element configured to receive an image formed by the zoom lens,
wherein the zoom lens consisting of:
a first lens unit having a negative refractive power,
a second lens unit having a positive refractive power, and
a third lens unit having a positive refractive power,
wherein the first lens unit, the second lens unit, and the third lens unit are arranged in order from an object side to an image side,
wherein distances between the first, second, and third lens units change during zooming,
wherein the first lens unit consists of two lenses, and
wherein the following conditions are satisfied $$-0.587 \leq fl/ft < -0.20$$

$$-0.39 < (R2r - R1f)/(R2r + R1f) < 0.36$$

where R1f and R2r represent radii of curvature of a lens surface closest to the object side in the first lens unit and a lens surface closest to the image side in the first lens unit, fl represents a focal length of the first lens unit, and ft represents a focal length of the entire zoom lens at a telephoto end.

9. The image pickup apparatus according to claim 8, wherein an effective image circle diameter at a wide angle end is smaller than at the telephoto end.

10. A zoom lens comprising:
a first lens unit having a negative refractive power;
a second lens unit having a positive refractive power; and
a third lens unit having a positive refractive power,
wherein the first lens unit, the second lens unit, and the third lens unit are arranged in order from an object side to an image side,
wherein distances between the first, second, and third lens units change during zooming,
wherein the first lens unit consists of two lenses, and
wherein the following conditions are satisfied:

$-0.60 < fl/ft < -0.20$ $-0.39 < (R2r-R1f)/(R2r+R1f) < 0.36$ $-2.8 < fG2/fG1 < -2.4$ where R1f and R2r represent radii of curvature of a lens surface closest to the object side in the first lens unit and a lens surface closest to the image side in the first lens unit, fl represents a focal length of the first lens unit, ft represents a focal length of the entire zoom lens at a telephoto end, and fG1 and fG2 represent focal lengths of an object-side lens and an image-side lens in the first lens unit.

11. The zoom lens according to claim 10, wherein the following conditional expression is satisfied:

$-0.33 < (R2f-R1r)/(R2f+R1r) < 0.33$ where R1r represents a radius of curvature of an image-side lens surface of an object-side lens in the first lens unit, and R2f represents a radius of curvature of an object-side lens surface of an image-side lens in the first lens unit.

12. The zoom lens according to claim 10, wherein the following condition is satisfied:

$1.880 < (Nd1+Nd2)/2 < 2.500$ where Nd1 and Nd2 represent refractive indices of materials of an object-side lens and an image-side lens in the first lens unit with respect to a d-line.

13. The zoom lens according to claim 10, wherein the lens surface closest to the object side in the first lens unit is aspherical such that a positive refractive power decreases from a lens center to a lens periphery.

14. The zoom lens according to claim 10, wherein the second lens unit consists of three lenses.

15. The zoom lens according to claim 10, wherein an object image is displaced in a direction perpendicular to an optical axis of the zoom lens by moving the second lens unit so as to have a component in the direction perpendicular to the optical axis.

16. A zoom lens comprising:
a first lens unit having a negative refractive power;
a second lens unit having a positive refractive power; and
a third lens unit having a positive refractive power,
wherein the first lens unit, the second lens unit, and the third lens unit are arranged in order from an object side to an image side,
wherein distances between the first, second, and third lens units change during zooming,
wherein the first lens unit consists of two lenses,
wherein the second lens unit consists of three lenses, and
wherein the following conditions are satisfied:

$-0.60 < fl/ft < -0.20$ $-0.39 < (R2r-R1f)/(R2r+R1f) < 0.36$ where R1f and R2r represent radii of curvature of a lens surface closest to the object side in the first lens unit and a lens surface closest to the image side in the first lens unit, fl represents a focal length of the first lens unit, and ft represents a focal length of the entire zoom lens at a telephoto end.

17. The zoom lens according to claim 16, wherein the following conditional expression is satisfied:

$-0.33 < (R2f-R1r)/(R2f+R1r) < 0.33$ where R1r represents a radius of curvature of an image-side lens surface of an object-side lens in the first lens unit, and R2f represents a radius of curvature of an object-side lens surface of an image-side lens in the first lens unit.

18. The zoom lens according to claim 16, wherein the following condition is satisfied:

$1.880 < (Nd1+Nd2)/2 < 2.500$ where Nd1 and Nd2 represent refractive indices of materials of an object-side lens and an image-side lens in the first lens unit with respect to a d-line.

19. The zoom lens according to claim 16, wherein the lens surface closest to the object side in the first lens unit is aspherical such that a positive refractive power decreases from a lens center to a lens periphery.

20. The zoom lens according to claim 16, wherein an object image is displaced in a direction perpendicular to an optical axis of the zoom lens by moving the second lens unit so as to have a component in the direction perpendicular to the optical axis.

* * * * *